United States Patent Office 3,453,240
Patented July 1, 1969

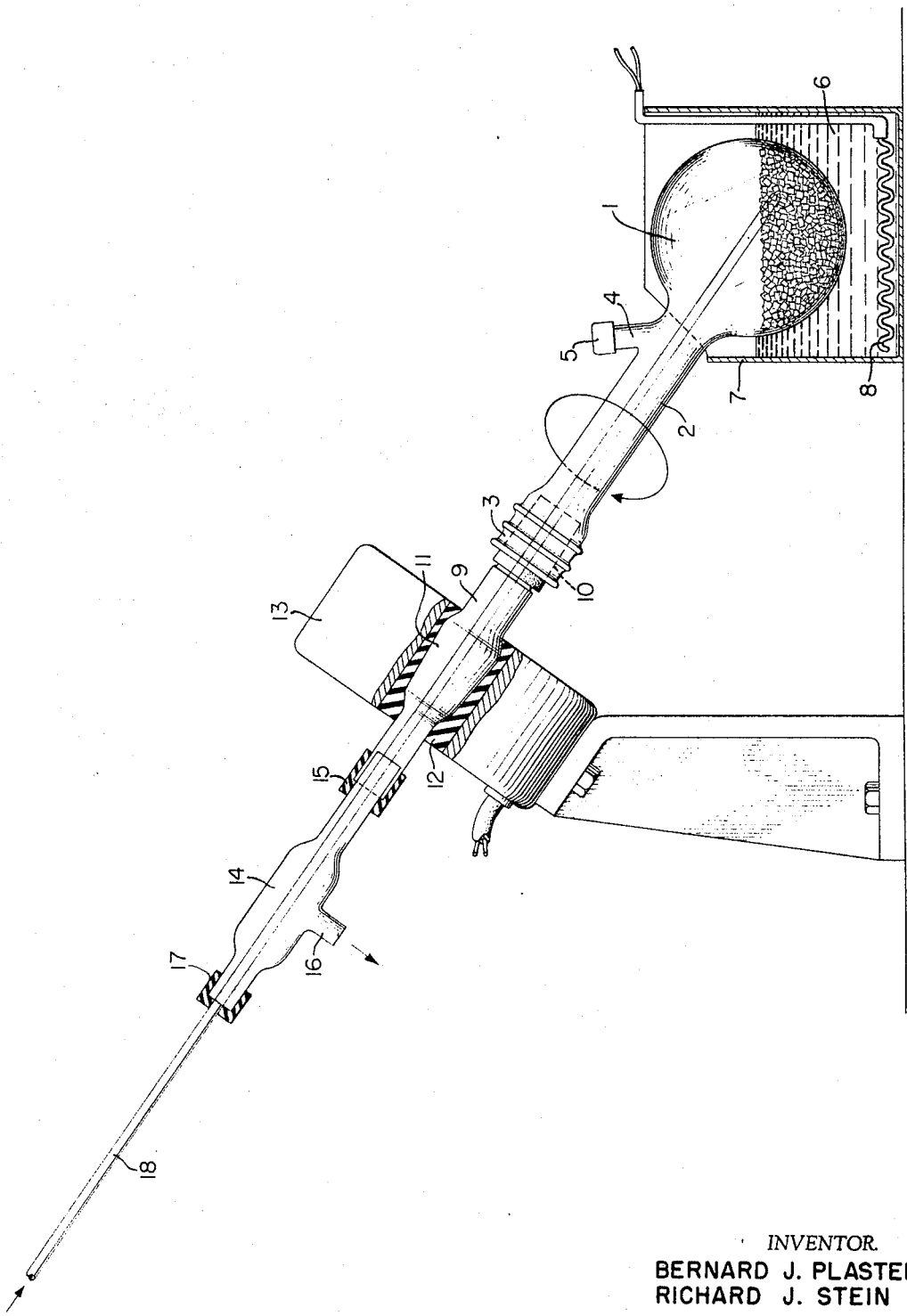

3,453,240
POLYESTER RESIN TREATMENT WITH
ETHYLENE GLYCOL
Bernard J. Plaster, Akron, and Richard J. Stein, Cuyahoga Falls, Ohio, assignors to The Goodyear Tire & Rubber Company, Akron, Ohio, a corporation of Ohio
Filed Sept. 24, 1964, Ser. No. 398,937
Int. Cl. C08g 17/01, 17/003
U.S. Cl. 260—75          5 Claims This invention relates to an improved process for preparing highly polymeric linear condensation polyesters. More particularly the invention relates to a process whereby a passive polyester resin can be activated and then polymerized to a high degree.

In the manufacture of linear condensation polyester resins some batches are prepared which polymerize very slowly or which polymerize to a certain degree and then do not polymerize further. Such polyester resin is considered to be passive and may not be useful for the application in which it was intended to be used. In an economical process of making condensation polyesters such resin must be reclaimed or reprocessed. According to the prior art such polyester resin was converted into lower alkyl esters of the acids from which it was derived or it was depolymerized to liquid state and then reconverted to high molecular weight resin by polymerization with additional amounts of catalyst.

It is an object of this invention to provide a method for activating a passive polyester resin so that it can be further polymerized without converting it to lower alkyl esters of the acid or to liquid monomeric state. It is another object of this invention to provide a method for accelerating the rate of polymerization of a polyester resin. Another object of the invention is to provide a method whereby polyester resin of very high molecular weight can be consistently obtained. Other objects of the invention will appear as the description of the invention proceeds.

According to the invention a passive polyester resin or a polyester resin that has a very slow polymerization rate can be activated and further polymerized by treating the resin in solid state with ethylene glycol at a temperature below the melting temperature of the polyester resin and then subjecting the treated polyester to solid state polymerization conditions.

The invention is illustrated by the following examples:

EXAMPLE 1

Polyethylene terephthalate was prepared by reacting dimethyl terephthalate and ethylene glycol under ester interchange and condensation conditions according to known procedure using as catalysts 0.03 percent of zinc acetate and 0.03 percent of antimony trioxide based on the weight of the dimethyl terephthalate used. The condensation reaction tapered off and stopped when the polymer had attained a degree of polymerization such that the product had an intrinsic viscosity of 0.768 measured in a 60/40 phenol-tetrachloroethane mixed solvent at 30.0° C.

A portion of the resin was crystallized by heating it at 140° C. It was then ground to a particle size small enough to pass through a 20 mesh screen. After grinding and screening the polymer was dried by heating at 140° C. under vacuum.

Thirty grams of this finely ground resin were soaked for five days in ethylene glycol. The excess glycol was filtered off. The resin was washed with acetone to remove glycol that was on the surface of the resin. It was then dried by heating at 80° C. for about 16 hours in a circulating air oven.

The polyester resin was then treated in the apparatus shown in the drawing as follows: The reaction vessel, which is a small round bottom flask 1 having a long neck 2 equipped with a female standard taper ground glass joint 3, was charged with the resin through sampling port 4. The port 4 was then covered with removable cap 5. Flask 1 containing the resin was mounted so that a portion of the flask was immersed in oil 6 contained in an insulated stainless steel pot 7. The oil 6 was heated to a temperature of 236° C. by means of a heating element 8 connected to a power source, not shown. Ground glass joint 3 was connected to one end of glass tube 9 by means of male ground glass joint 10. The tube 9 was equipped with an enlarged portion 11 adapted to fit in bushing 12 of center bore rotating motor 13. The other end of tube 9 was fitted to an adapter tube 14 by means of rubber bushing 15. Adapter tube 14 was equipped with a side arm 16 and a bushing 17 having a centrally located hole adapted to fit snugly around stainless steel tube 18. The stainless steel tube 18 extended from a position close to the bottom of the flask 1 to a short distance outside of the bushing 17. Nitrogen gas was passed slowly into the apparatus through the stainless steel tube 18 and out of the apparatus through the side arm 16 as tube 9 and flask 1 were rotated by motor 13.

During the first 30 minutes a considerable amount of glycol distilled out of the polymer. After one hour of heating at 236° C. at atmospheric pressure the side arm 16 of adapter tube 14 was connected to a vacuum source, not shown and the pressure in the system was rapidly reduced to 0.3 millimeter of mercury pressure and maintained at this pressure while heating was continued at 236° C. for four hours. After this treatment the product had an intrinsic viscosity of 1.305.

In a control run 30 grams of the same polymer heated under the same conditions for five hours but without the glycol treatment had an intrinsic viscosity of 0.935.

EXAMPLE 2

Thirty grams of amorphous polyester resin prepared as in Example 1, having an intrinsic viscosity of 0.601, was cut into ⅛ inch cubes and soaked for five days in ethylene glycol. The excess glycol was filtered from the polymer, and the polymer then washed with acetone to remove glycol on the surface of the cubes. The polymer was crystallized by heating it for one hour at 140° C. and was then ground to pass a 20 mesh screen. The granular resin was placed in the solid state reactor described in Example 1 and heated at 236° C. under a nitrogen atmosphere. During the first 30 minutes a considerable amount of glycol distilled from the polymer. After one hour of heating at 236° C. at atmospheric pressure the pressure in the system was rapidly reduced to 0.1 millimeter of mercury pressure and heating was continued at 236° C. After four hours under these conditions the polymer had an intrinsic viscosity of 0.990, and after five hours an intrinsic viscosity of 1.050.

In a control run 30 grams of this same polymer heated under the same conditions but without the glycol treatment had an intrinsic viscosity of 0.775 after four hours, and in five hours an intrinsic viscosity of 0.800.

EXAMPLE 3

Thirty grams of the crystalline polyester resin used in Example 1 having an intrinsic viscosity of 0.768 were placed in a solid state reactor of the type used in Example 1. It was heated in a nitrogen atmosphere to a temperature of 180° C. without rotating the flask. Then 0.25 milliliter of ethylene glycol was injected into the polymer bed. The temperature was slowly raised over a period of about 30 minutes to 236° C. The polyester resin was heated at this temperature at atmospheric pressure for 30 minutes. The intrinsic viscosity of the polymer was 0.539. The pressure in the system was rapidly reduced to 2.5 millimeters of mercury pressure and heating was continued at 236° C. for 30 minutes. Then the pressure in the system was further reduced to 0.05 millimeter of mercury pressure and the resin was heated at this pressure at 236° C. for five and one-half hours. The polymer had an intrinsic viscosity of 1.295.

A control was run on the same polymer without the glycol injection. This polymer had an intrinsic viscosity of 0.962 after being treated in the same way for the same period of time.

The above examples show that the method of the invention activates passive polyester so that it can be polymerized further and that it accelerates the rate of polymerization of a regular active polyester. The glycol treatment can be performed in various ways. For example, polyester particles can be soaked in glycol or the glycol can be injected into a bed of polymer particles. If desired, the glycol can be vaporized and the polyester contacted with the vapor.

The invention has been illustrated particularly with respect to poly(ethylene terephthalate). It can be used with other polyesters of copolyesters. Representative examples of such polyesters are polyesters derived from dicarboxylic acids or ester forming derivatives thereof and glycols, for example, poly(tetramethylene terephthalate), poly(cyclohexylene dimethylene terephthalate), poly(ethylene bibenzoate), poly(ethylene-2,6-naphthalate), copolyesters such as ethylene terephthalate-ethylene isophthalate copolyesters, ethylene terephthalate-neopentyl terephthalate copolyesters, ethylene terephthalate-2,2-bis-[4(beta hydroxy ethoxy phenyl) propane] terephthalate copolyesters, tetramethylene terephthalate-tetramethylene isophthalate copolyesters, ethylene terephthalate-ethylene-2,6 naphthalate copolyesters, ethylene terephthalate-ethylene adipate copolyesters and ethylene terephthalate-ethylene sebacate copolyesters.

The temperature used for the solid state polymerization depends somewhat on the particular polymer being polymerized. Generally the temperature used will be in the range of from about 20° C. below the melting point of the polymer to a minimum temperature of about 10 to 20° C. above the sticking temperature of the polymer. For example, in the treatment of polyethylene terephthalate and its subsequent polymerization by the solid state method the maximum temperature used will be about 245° C. and the minimum will be about 180° C. It is obvious that the temperatures used for other polyesters will vary somewhat, depending on their melting points and sticking temperatures, as set out above.

The pressures used can be varied widely. The pressure may be atmospheric pressure or subatmospheric pressure. Generally the pressure used in the solid state polymerization will be subatmospheric and usually less than one millimeter of mercury pressure because at low pressures the polymerization reaction proceeds more rapidly.

The polymerization is carried out until the polyester attains the desired intrinsic viscosity, generally until the intrinsic viscosity is 0.6 to 1.5. Higher viscosities can be attained if desired. The time required for the polymerization depends on various factors such as the intrinsic viscosity of the original polyester, the final viscosity desired and the temperature and pressure used for the polymerization.

While certain representative embodiments and details have been shown for the purpose of illustrating the invention it will be apparent to those skilled in this art that various changes and modifications may be made therein without departing from the spirit or scope of the invention.

What we claim is:

1. In the process of preparing highly polymeric linear polyesters by solid state polymerization having an intrinsic viscosity of at least 0.6 the improvement which consists essentially of treating the resin in solid state with ethylene glycol at a temperature below the melting temperature of the resin and then subjecting the resin to solid state condensation polymerization at a temperature lower than 20° C. below the melting temperature of the resin.

2. In the process of polymerizing polyester resin to form high molecular weight resin having an intrinsic viscosity of at least 0.6 by the solid state process the method of increasing the rate of polymerization of the resin which consists essentially of treating the resin in solid state with ethylene glycol at a temperature below the melting temperature of the resin and heating the resin under solid state condensation polymerization at a temperature lower than 20° C. below the melting temperature of the resin.

3. In the process of preparing highly polymeric linear condensation polyesters by solid state polymerization having an intrinsic viscosity of at least 0.6 the method of increasing the rate of polymerization of the resin which consists essentially of treating the resin in solid state with ethylene glycol at a temperature below the melting temperature of the resin and heating it at a temperature lower than about 20° C. below the melting temperature of the polyester at subatmospheric pressure of about one millimeter of mercury pressure.

4. The process of claim 1 in which the polyester resin used is polyethylene terephthalate.

5. The process of claim 1 in which the polyester resin used is an ethylene terephthalate-ethylene isophthalate copolyesters.

References Cited

UNITED STATES PATENTS

| | | | |
|---|---|---|---|
| 2,534,028 | 12/1950 | Izard | 260—75 |
| 3,344,091 | 9/1967 | Russin et al. | 260—2.3 |
| 2,965,513 | 12/1960 | Milone et al. | 260—75 |
| 2,465,319 | 3/1949 | Whinfield et al. | 260—75 |
| 3,257,355 | 6/1966 | Whitfield et al. | 260—75 |

OTHER REFERENCES

Goodman and Rhys: Polyesters, vol. I, 14–17, 29–31, New York, Elsevier, 1965.

WILLIAM H. SHORT, *Primary Examiner.*

M. GOLDSTEIN, *Assistant Examiner.*

U.S. Cl. X.R.

260—2.3